March 31, 1942.    C. L. CONNERS    2,277,957
WEIGHING SCALE
Filed Oct. 6, 1938    2 Sheets-Sheet 1
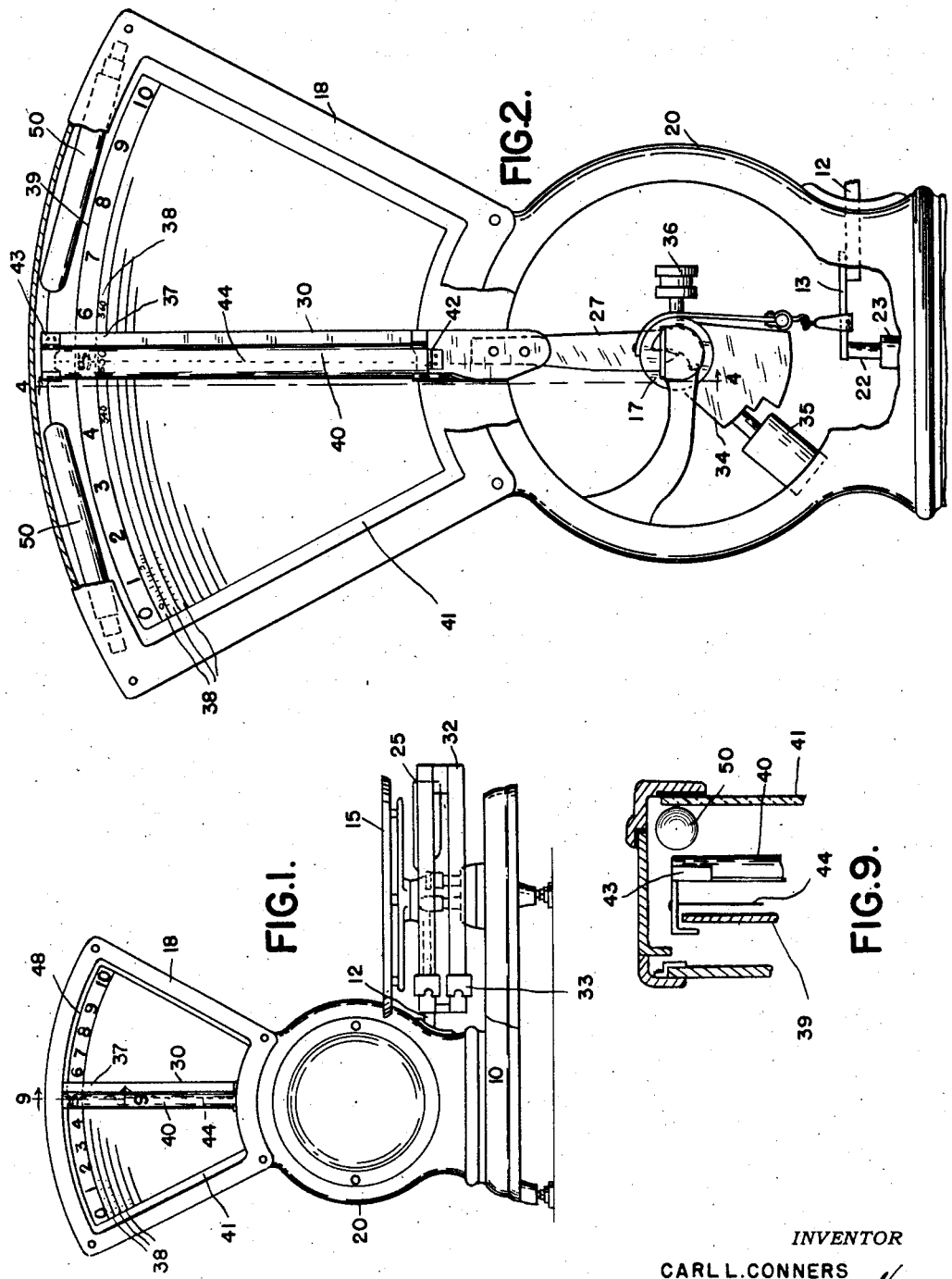
INVENTOR
CARL L. CONNERS
BY
ATTORNEYS

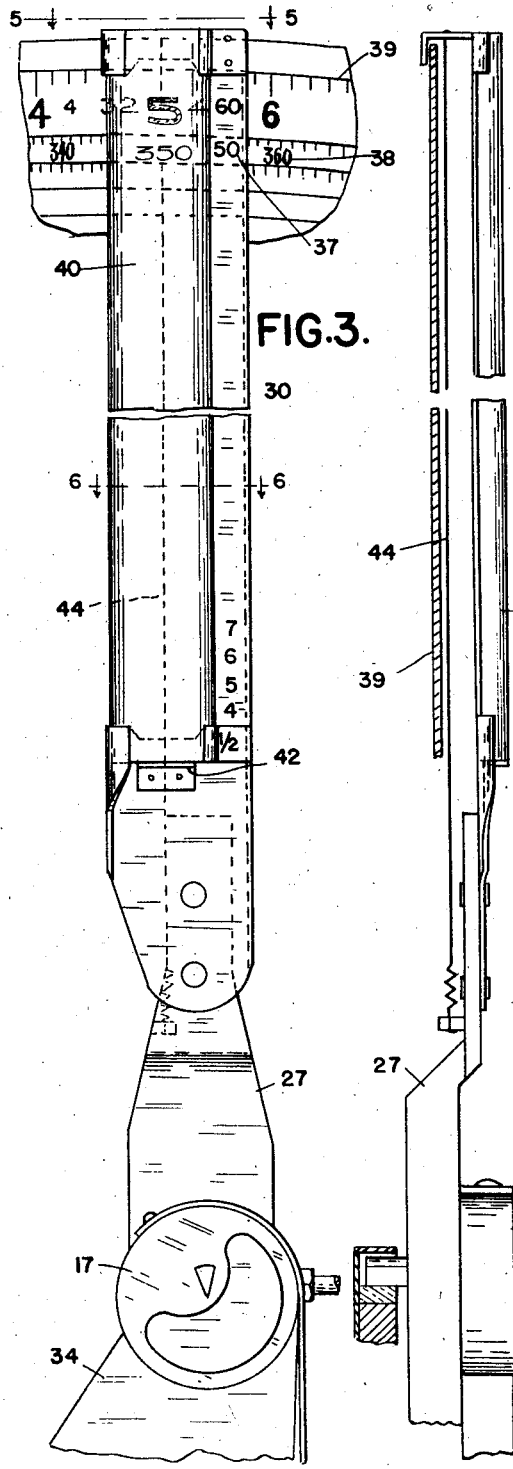

Patented Mar. 31, 1942

2,277,957

UNITED STATES PATENT OFFICE 2,277,957

WEIGHING SCALE

Carl L. Conners, Louisville, Ky., assignor to Walter F. Stimpson, Louisville, Ky.

Application October 6, 1938, Serial No. 233,645

1 Claim. (Cl. 88—1)

This invention relates to fan-type weighing scales, of the variety having a fixed, sector-shaped computing chart swept by an elongated hand, the hand having a hair-line pointer and price-per-unit-weight indicia adapted to cooperate with total price figures on the chart. The primary object of the present invention is to provide improved means whereby the usefulness of such a scale and the accuracy with which it may be read are increased by a novel lens and mounting means for supporting the same upon the hand. An additional object is to provide a greater number of weight indications within a given space, rendering the scale more compact and accordingly less expensive in proportion to its capacity.

Other objects and advantages will be apparent from the following description, wherein reference is made to the accompanying drawings illustrating a preferred embodiment of my invention and wherein similar reference numerals designate similar parts throughout the several views.

Figure 1 is a front elevational view of a scale constructed in accordance with the present invention.

Figure 2 is an enlarged front elevational view of the chart housing portion and the actuating and interconnecting mechanism by which the hand is driven.

Figure 3 is an enlarged elevational view of the improved hand construction and lens mounting means, also showing a fragment of the chart, the hand being centrally broken away.

Figure 4 is a vertical sectional view taken substantially on the line 4—4 of Figure 2 and looking in the direction of the arrows.

Figure 5 is a fragmentary top view of the hand and chart, taken as indicated by the line and arrows 5—5 of Figure 3.

Figure 6 is a detailed sectional view taken substantially on the line 6—6 of Figure 3 and looking in the direction of the arrows.

Figure 7 is a fragmentary perspective view of the hand construction viewed from the rear and centrally broken away, indicating in dotted lines the relative position of the chart.

Figure 8 is a fragmentary perspective view of the front of the hand assembly.

Figure 9 is a sectional detail taken substantially on the line 9—9 of Figure 1 and looking in the direction of the arrows.

Referring now to the drawings, it will be seen that the invention is applicable to scales whose major parts may be constructed in a manner more or less conventional. The base 10 supports at one end upon a lever 12 a platform 15, while at the other end the fan-shaped chart housing 18 is carried upon a generally circular housing 20 within which is arranged the means for connecting the lever to the hand. The principal counterbalancing means comprises a weight 25 mounted at the outer end of the main lever, while the inner end of the lever projects through the side of the circular housing 20, where its nose iron 15 is connected through stirrup 14, strap 16, and eccentric 17 to the hand support 27, rigidly attached to the eccentric. The nose iron is also connected to piston rod 22, whose piston (unshown) travels in a dashpot cylinder 23 to damp the oscillation of the weighing system. These and the other parts thus far described, since they may be of the usual or any suitable construction, have been mentioned only briefly, and the details of their arrangement are of course optional, as is also the use of the tare beam and poise assembly 32, 33. The usual counterbalancing means, such as the weights 34, 35, 36 may also be attached to the hand support 27 and the accentric 17.

The hand comprises a sheet metal arm 30, attached at its lower end to the support 27 and carrying a series of indicia as 37 therealong, which may designate price per unit weight, and be adapted to cooperate with and sweep over rows of indicia as 38, arranged concentrically with the hand and the paths of the indicia 37 carried thereby. The total price indicia 38 are carried upon a chart 39 fixed in the chart housing 18, the chart and hand being visible through a window 41 which forms the front wall of the chart housing.

Longitudinally carried by the arm 30 is a lens 40 of partly cylindrical form, shown as of plano-convex shape, although this is subject to variation. It will be noted that the lens supporting means consists of fingers 42, 43 projecting laterally from the top and bottom of the arm to embrace the farther edges of the lens, but that such edge and the top of the lens are uncovered, thus preventing shadows which would otherwise reduce the illumination of the chart. If artificial illuminating means such as the light bulb 50 is mounted in the chart housing at its top, it may shine directly through the uncovered top of the lens, so that no part of the chart under the hand is shadowed, and the same is true of the fine wire 44, providing "hair-line" reading of the figures carried by the hand behind the lens and adapted to move in a position close to the chart. These features have been found especially important because of the more intense lighting made necessary by the magnification.

The figures 38, as well as the weight indicia 48 at the top of the chart 39, may be of reduced width, allowing a more compact arrangement of figures, upon a smaller chart than would otherwise be possible, or the use of a greater number of figures, due to the tendency of the lens to spread the figures laterally, as shown in Figure 3. The weight of the lens, which may be formed of glass or transparent plastic, is properly offset by suitable proportioning of the weights 34, 35, 36, as will be readily apparent to those skilled in the art.

What I claim is:

A magnifying indicator construction for a weighing scale of the variety having a fixed chart and illuminating means located at the top and in front of the chart, comprising a hand assembly pivoted to swing in a path over the front of and substantially parallel to the chart, said hand assembly comprising a supporting arm, a lens of approximately partly cylindrical form carried by and extending longitudinally of the arm and having its axis substantially parallel to the hand assembly, holding portions carried by the arm and securing said lens thereto in a position beside and substantially parallel to the arm, both sides of the lens being uncovered, and the upper end of said lens also being open and uncovered, whereby light from said illuminating means may be transmitted through the lens both from above and from in front of the hand.

CARL L. CONNERS.